US007006807B2

(12) United States Patent
Szczublewski et al.

(10) Patent No.: US 7,006,807 B2
(45) Date of Patent: Feb. 28, 2006

(54) ELECTRONIC BROADCAST RADIO SKIP PROTECTION

(75) Inventors: Francis E. Szczublewski, Macomb, MI (US); Laci J. Jalics, Ray, MI (US)

(73) Assignee: Delphi Technologies, Inc., Troy, MI (US)

( * ) Notice: Subject to any disclaimer, the term of this patent is extended or adjusted under 35 U.S.C. 154(b) by 941 days.

(21) Appl. No.: 09/780,710

(22) Filed: Feb. 12, 2001

(65) Prior Publication Data

US 2002/0110247 A1 Aug. 15, 2002

(51) Int. Cl.
*H04B 1/16* (2006.01)

(52) U.S. Cl. .................... 455/227; 455/3.06; 381/71.4; 381/86

(58) Field of Classification Search ................ 455/227, 455/403, 404.1, 412.2, 414.1, 414.3, 414.4, 455/521, 3.06; 381/1, 2, 3, 12, 15, 302, 71.4, 381/86

See application file for complete search history.

(56) References Cited

U.S. PATENT DOCUMENTS

| | | | | |
|---|---|---|---|---|
| 5,408,448 | A | 4/1995 | Carman | 369/32 |
| 5,592,471 | A * | 1/1997 | Briskman | 455/506 |
| 5,734,780 | A | 3/1998 | Ichiura et al. | |
| 5,917,430 | A * | 6/1999 | Greneker et al. | 340/905 |
| 6,192,340 | B1 * | 2/2001 | Abecassis | 704/270 |
| 6,408,128 | B1 * | 6/2002 | Abecassis | 386/68 |
| 6,598,228 | B1 * | 7/2003 | Hejna, Jr. | 725/91 |
| 6,600,898 | B1 * | 7/2003 | De Bonet et al. | 455/3.04 |
| 6,775,654 | B1 * | 8/2004 | Yokoyama et al. | 704/500 |

FOREIGN PATENT DOCUMENTS

| | | |
|---|---|---|
| DE | 4041639 | 9/1992 |
| EP | 1037419 A | 9/2000 |
| GB | 2258102 | 1/1993 |
| WO | 9818228 | 4/1998 |
| WO | 9848566 | 10/1998 |

* cited by examiner

*Primary Examiner*—Edward F. Urban
*Assistant Examiner*—Thuan Nguyen
(74) *Attorney, Agent, or Firm*—Stefan V. Chmielewski

(57) ABSTRACT

Transitory audio information that is subject to interruption is provided without loss of content. Transitory audio information received from an audio source is audibly provided until an interrupt signal is received. The transitory audio information is buffered while a message associated with the interrupt signal is audibly provided. Upon conclusion of the message, the buffered transitory audio information is audibly provided.

23 Claims, 4 Drawing Sheets

ELECTRONIC BROADCAST RADIO SKIP PROTECTION

TECHNICAL FIELD

The present invention is directed to providing transitory audio information, and more particularly to audibly providing transitory audio information, that is subject to interruption, to an occupant of a motor vehicle.

BACKGROUND OF THE INVENTION

Today, the trend has been for motor vehicles to include a number of audio sources that share components of the motor vehicle audio subsystem. For example, in certain models manufacturers have incorporated the ability for certain automotive subsystems to provide an audible message to an occupant of the motor vehicle through the audio subsystem, as the need arises. In motor vehicles that have this capability, an audio source can be interrupted for a period of time that corresponds to the length of the message. When the interrupted audio source is internal to the vehicle, for example, a music compact disk (CD), the playing of the CD is resumed upon completion of the message, without loss of content. That is, the CD resumes play such that no music is omitted.

However, when the audio source is external to the vehicle, such as broadcast radio, transitory audio information (e.g., an event in a football game) can be missed. This has resulted in measurable customer dissatisfaction when a message interrupts transitory audio information of interest to the customer. While certain television (TV) systems have included the ability to capture a portion of a TV broadcast for replay and other CD systems have implemented electronic skip protection, no known systems have provided transitory audio information that can be interrupted by a message from, for example, an automotive subsystem without noticeable loss of content.

As such, it is desirable for an audio subsystem to provide transitory audio information that is subject to interruption without noticeable loss of content.

SUMMARY OF THE INVENTION

The present invention is directed to providing transitory audio information, that is subject to interruption, without appreciable loss of content. When transitory audio information is received from an audio source, the transitory audio information is audibly provided until an interrupt signal is received. The transitory audio information is then buffered while a message associated with the interrupt signal is audibly provided. According to one embodiment, upon conclusion of the message, the buffered transitory audio information is audibly provided at a faster rate than new transitory audio information is being received.

These and other features, advantages and objects of the present invention will be further understood and appreciated by those skilled in the art by reference to the following specification, claims and appended drawings.

BRIEF DESCRIPTION OF THE DRAWINGS

The present invention will now be described, by way of example, with reference to the accompanying drawings, in which.

DESCRIPTION OF THE PREFERRED EMBODIMENTS

According to one embodiment of the present invention, when a motor vehicle radio is turned on, the broadcast audio provided by the radio receiver enters and exits a buffer without being stored. When the radio broadcast is interrupted, the buffer accumulates the broadcast audio until the interruption is complete. Upon the completion of the interruption, the radio broadcast resumes play from the point of interruption and new broadcast audio continues to accumulate in the buffer such that the motor vehicle occupant audibly receives a continuous stream of audio. Preferably, when the radio station is changed from one station to another, the buffer is cleared. Further, when the radio is turned off or when the occupant specifically selects audio from another audio source, which may include a CD, a cassette player, a MP3 player, etc., the buffer is also cleared. In a preferred embodiment, the buffered audio is played back at a faster than real-time rate, such that, over a period of time, the time delay between receiving and providing new transitory information is reduced to approximately zero.

According to another embodiment of the present invention, a repeat function is implemented. The repeat function causes the last few seconds (e.g., five seconds) of the broadcast to be repeated and is preferably initiated by the actuation of a 'repeat' button. According to another embodiment of the present invention, repeated activation of the 'repeat' button causes the same stored transitory information to be repeated or causes information prior to that already repeated to also be repeated. Advantageously, the present invention allows automotive audio subsystems to present substantially all audio information without noticeable loss of content.

Figure 1:
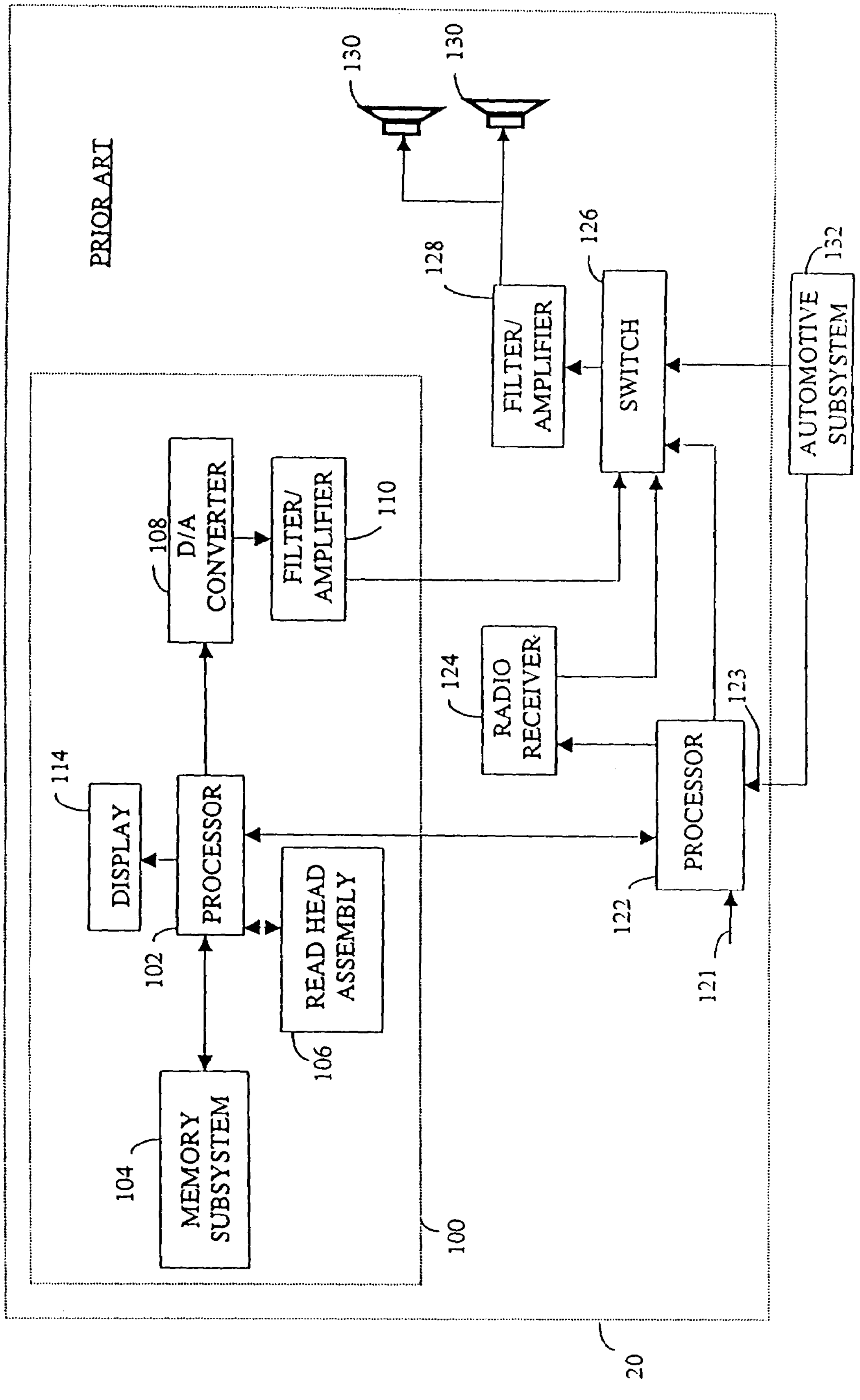
FIG. 1 is an electrical block diagram of an exemplary prior art automotive audio subsystem including multiple audio sources.

Referring to FIG. 1 an exemplary audio subsystem 20 is shown, according to the prior art. A CD player subsystem 100 includes a processor 102 that is coupled to a display 114, a memory subsystem 104, a read head assembly 106 and a digital-to-analog (D/A) converter 108. The memory subsystem 104 includes an application appropriate amount of volatile memory (e.g., dynamic random access memory (DRAM)) and non-volatile memory (e.g., flash memory, electrically erasable programmable read-only memory (EEPROM)). The read head assembly 106 supplies audio information read from a currently active CD to the processor 102.

The processor 102 provides the read audio information to the D/A converter 108, which converts the digital information to analog audio information and supplies the information to a filter/amplifier 110. The filter/amplifier 110 is coupled to a switch 126 of the audio subsystem 20. The processor 102 is also coupled to an audio processor 122, for inter-processor communication. As shown, the processor 122 is also coupled to a radio receiver 124 and the switch 126. The processor 122 receives an input 121 (e.g., a select button is asserted to change from radio to CD) and an input 123 (e.g., an interrupt signal from an automotive subsystem 132), and based upon these inputs controls the switch 126 to provide an appropriate audio source to an occupant of the motor vehicle. The input 123 may be, for example, provided by a collision warning subsystem, a route subsystem or an e-mail subsystem. The switch 126 provides the selected input (i.e., input from the radio receiver 124, CD player subsystem 100 or the automotive subsystem 132) to a filter/amplifier 128. The filter/amplifier 128, in turn, provides the selected audio information after filtering and amplification to a pair of speakers 130.

The processor 102 is also coupled to the display 114, which is utilized for supplying various information to an occupant of the motor vehicle. It should be appreciated that the audio subsystem 20 cannot provide transitory audio information, from the radio receiver 124, without loss of content when the radio receiver 124 is interrupted by a message (e.g., an interrupt signal on the input 123). While the discussion herein is directed to providing audio, it should be appreciated that many aspects of the invention are equally applicable to transitory video signals.

Figure 2:
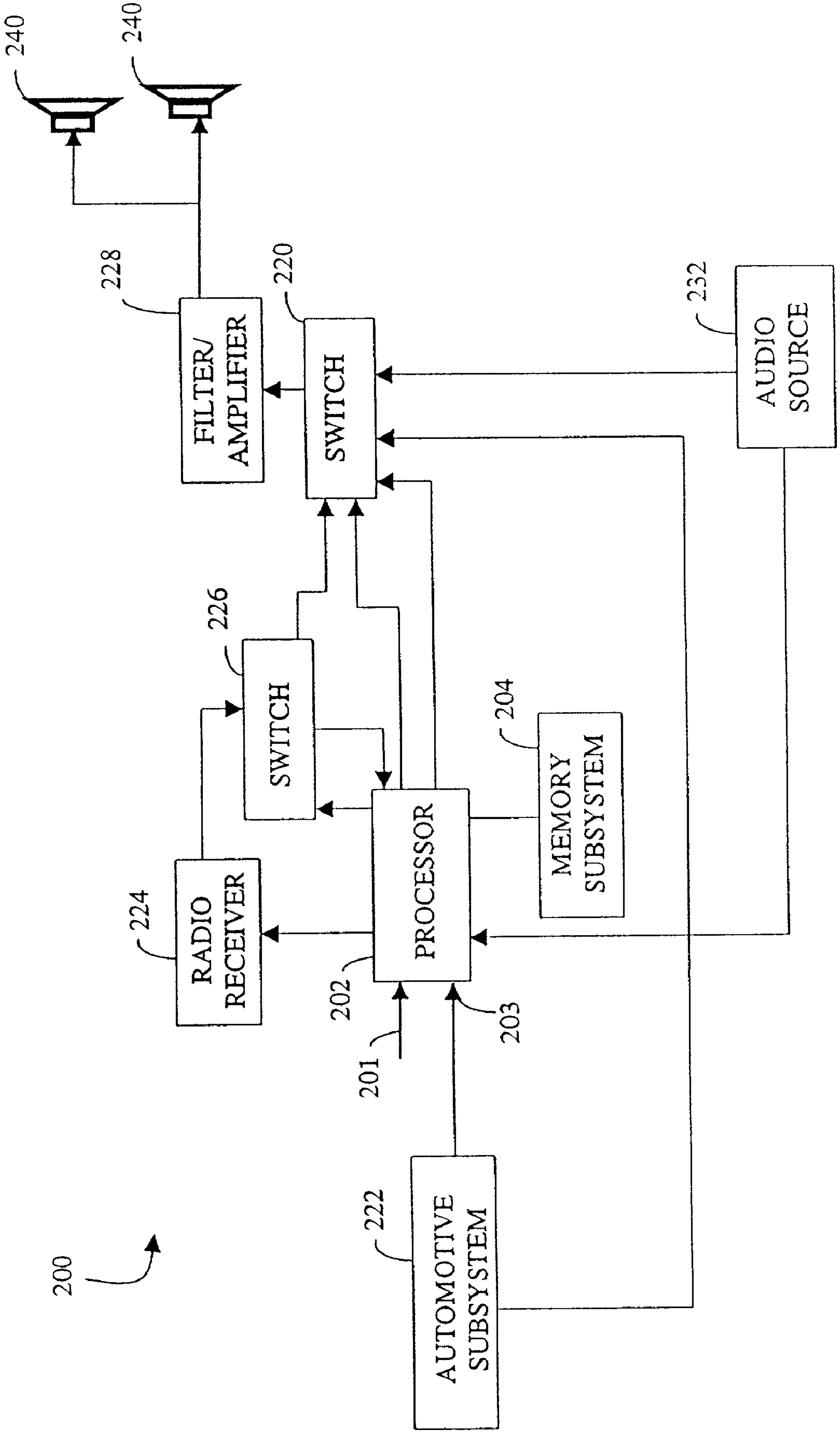
FIG. 2 is an electrical block diagram of an automotive audio subsystem, according to an embodiment of the present invention.

FIG. 2 illustrates an automotive information system 200 that provides transitory audio information that is subject to interruption, without noticeable loss of content. A processor 202 is coupled to a memory subsystem 204, which is utilized for storing information and may be utilized to buffer transitory audio information, according to an embodiment of the present invention. The processor 202 is also coupled to a radio receiver 224 and a switch 226. The processor 202 is configured to cause the radio receiver 224 to change channels based upon, for example, a signal on input 201.

The processor 202 also controls a switch 220 according to an input 203 received from an automotive subsystem 222 (e.g., a collision warning subsystem, a routing subsystem and/or an e-mail subsystem). When the processor 202 receives an interrupt signal from the automotive subsystem 222, on the input 203, the processor 202 controls the switch 226 such that transitory audio information is no longer provided through the switch 220. That is, the processor 202 controls the switch 226 such that transitory audio information is sampled and stored as digital data within a FIFO buffer, located within the memory subsystem 204. At approximately the same time, the processor 202 actuates the switch 220 such that an analog message received from the automotive subsystem 222 is routed to a filter/amplifier 228 and a pair of speakers 240, such that an audible message is provided to an occupant of the motor vehicle. The message provided to the occupant of the vehicle may include, for example, an impending collision warning, a driving route instruction or notification that an e-mail is available to be displayed to an occupant of the motor vehicle.

The processor 202 may execute a compression routine that reduces the amount of memory required to store the transitory audio information in the memory subsystem 204. When the automotive subsystem 222 indicates to the processor 202 that the message is complete, the processor 202 routes the buffered transitory audio information through the switch 220 to the filter/amplifier 228 and the speakers 240, such that an occupant of the vehicle audibly receives the transitory audio information without noticeable loss of content. It will be appreciated that if the automotive subsystem 222 provides a digital message, a D/A converter is required to convert that digital message to an analog message. If the processor 202 receives a digital radio broadcast from the radio receiver 224, the processor 202 is not required to perform an A/D conversion, before storing the transitory audio information within the buffer, located within, for example, the memory subsystem 204. As mentioned above, the processor 202 may execute a compression routine to reduce the amount of memory space required for storage of the transitory audio. Alternatively, any compression can be performed by a separate integrated circuit (IC).

As an alternative to the processor 202 converting the buffered transitory audio information into an analog signal, an A/D converter can be provided between the processor 202 and the switch 220. It is also envisioned that a separate memory could be provided solely to buffer the transitory audio information. The processor 202, preferably, implements a pitch compensation routine, which allows the processor 202 to provide the buffered transitory audio at a faster rate without noticeably changing the pitch of the buffered transitory audio. As a general rule, a given listener can maintain comprehension and retention of speech that is time compressed by about fifty percent. The required buffer space is determined by the number of messaging features in a given vehicle, the length of the messages and how often those messages occur. Using MP3 compression, for example, one minute of CD quality sound can be reduced from eleven megabytes to one megabyte.

Figure 3:
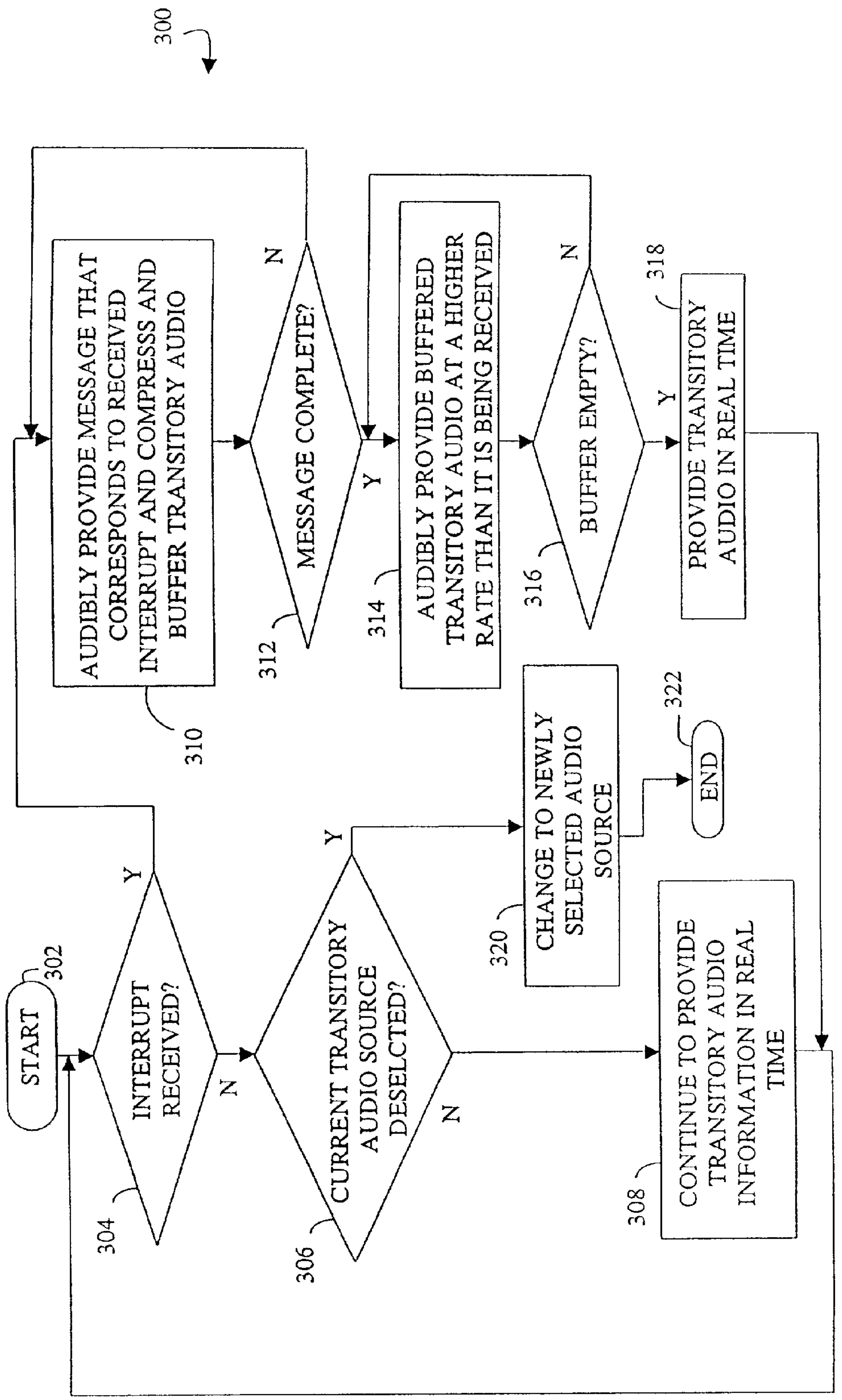
FIG. 3 is a flow chart of a buffering routine for buffering transitory audio when the transitory audio is interrupted by a message provided by an automotive subsystem.

FIG. 3 illustrates a buffering routine 300, according to an embodiment of the present invention. The routine 300 is initiated in step 302, at which point control transfers to decision step 304. In step 304, the processor 202 determines whether an interrupt has been received from, for example, the automotive subsystem 222. If so, control transfers from step 304 to step 310. In step 310, the processor 202 controls the switch 220 such that the message from audio subsystem 222 is audibly provided to an occupant of the motor vehicle, via the filter/amplifier 228 and the speakers 240 (i.e., an audio output device). Upon receipt of the interrupt, the processor 202 also begins buffering transitory audio, preferably, within the memory subsystem 204.

Next, in decision step 312, the processor 202 determines whether the message is complete. If the message is not complete, control returns to step 310. When the message is complete in step 312, control transfers to step 314 where the processor 202 audibly provides buffered transitory audio, preferably, at a higher rate than new transitory audio is being received. This allows the processor 202 to deplete the amount of information stored within the buffer such that buffer overruns do not occur. Then, in step 316, the processor 202 determines whether the buffer is empty. If the buffer is not empty, control transfers from step 316 to step 314. If the buffer is empty in step 316, the processor 202 causes control to transfer to step 318 and provides transitory audio in real-time. From step 318, control returns to step 304.

In step 304, when an interrupt has not been received, control transfers to decision step 306. In step 306, the processor 202 determines whether the current transitory audio source has been deselected. This can occur, for example, when a user asserts the input 201, which causes the processor 202 to provide a signal to the radio receiver 224 causing it to change channels. Alternatively, the signal provided on the input 201 may cause the processor 202 to turn off the radio receiver 224 and, for example, select a CD as the audio source. When the current transitory audio source is deselected in step 306, control transfers to step 320 where the processor 202 controls the switch 220 such that another audio source 232 is selected, at which point the routine 300 terminates at step 322. In step 306, when the current transitory audio source is not deselected, control transfers to step 308 where the processor 202, by controlling the switches 226 and 220, causes transitory audio information to be provided in real-time. Next, control transfers to step 304.

Figure 4:
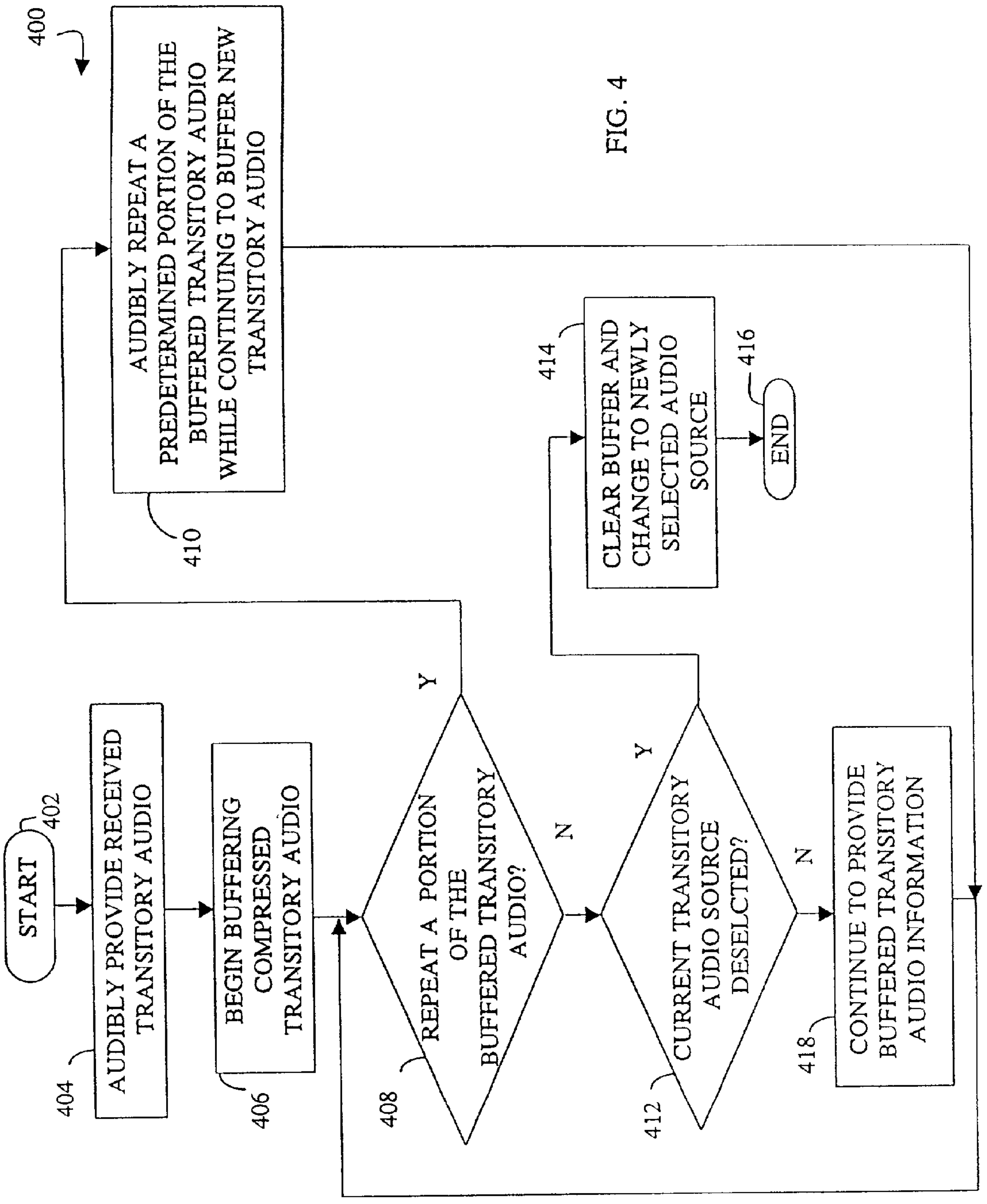
FIG. 4 is a flow chart of a repeat routine for repeating a predetermined portion of buffered transitory audio information.

FIG. 4 depicts a flow chart implementing a repeat routine 400, according to another embodiment of the present invention. From step 402, where the routine 400 is initiated, control transfers to step 404 where the processor 202 causes received transitory audio to be audibly provided to an occupant of the motor vehicle. Next, in step 406, the processor 202 begins buffering compressed transitory audio, within, for example, the memory subsystem 204. Then, in decision step 408, the processor 202 determines whether a portion of the buffered transitory audio has been selected by an occupant to be repeated. This could be implemented, for example, by adding a 'repeat' button to a radio head of the radio receiver 224. Alternatively, in a system that implements voice commands, a voice command could be utilized to cause the processor 202 to repeat a portion of the buffered transitory audio. If the occupant has elected to repeat a portion of the buffered transitory audio, control transfers to step 410.

In step 410, the processor 202 causes a predetermined portion of the buffered transitory audio to be audibly repeated while continuing to buffer new transitory audio. Preferably, the repeated audio is provided at a, rate that is higher than the rate at which new transitory audio is being received, such that buffer overflow does not occur. From step 410, control transfers to step 408. In step 408, when a vehicle occupant has not selected to repeat a portion of the buffered transitory audio, control transfers to decision step 412. In step 412, the processor 202 determines whether the current transitory audio source has been deselected. As previously indicated, this may occur when an occupant of the vehicle asserts the input 201 of the processor 202. When the current transitory audio source is deselected, control transfers to step 414, where the processor 202 clears the buffer, located within memory subsystem 204, and changes the audio source to the newly selected audio source. Next, the routine 400 ends in step 416. In step 412, when the current transitory audio source has not be deselected, control transfers to step 418 where the processor 202 continues to provide buffered transitory audio information through the switch 220.

Accordingly, audio subsystems have been described which, on the one hand, always buffer information and, on the other hand, only buffer information in response to an interrupt signal. By buffering transitory audio information when an interrupt is received and providing that information at a rate which is higher than the rate at which new transitory information is being received, upon completion of the message, an audio subsystem is provided that typically ensures greater motor vehicle occupant satisfaction with the audio subsystem. An audio subsystem including a repeat function, according to the present invention, allows a listener to repeat buffered portions of transitory audio when the listener has failed to comprehend a portion of the transitory audio.

The above description is considered that of the preferred embodiments only. Modifications of the invention will occur to those skilled in the art and to those who make or use the invention. Therefore, it is understood that the embodiments shown in the drawings and described above are merely for illustrative purposes and not intended to limit the scope of the invention, which is defined by the following claims as interpreted according to the principles of patent law, including the Doctrine of Equivalents.

What is claimed is:

1. A method for providing transitory audio information that is subject to interruption without appreciable loss of content, comprising the steps of:

receiving transitory audio information from an audio source;

audibly providing the transitory audio information until an interrupt signal is received;

when said interrupt signal is received, audibly providing a message that is associated with the interrupt signal;

buffering the transitory audio information while said message is audibly provided; and audibly providing the buffered transitory audio information upon conclusion of the message, wherein the buffered transitory audio information is provided at a faster rate than new transitory audio information is being received.

2. The method of claim 1, wherein the interrupt signal is initiated by the actuation of a repeat function and the message corresponds to a predetermined portion of the buffered transitory audio information.

3. The method of claim 1, wherein the message is a route instruction.

4. The method of claim 1, wherein the message is a collision warning.

5. The method of claim 1, wherein the buffered transitory audio information is stored in a compressed format.

6. The method of claim 1, further including the step of:

clearing the buffered transitory audio information when a different audio source is selected.

7. The method of claim 1, wherein the transitory audio information is provided in the form of a radio broadcast.

8. The method of claim 1, wherein the transitory audio information is buffered in response to the interrupt signal.

9. An automotive information system for providing transitory audio information that is subject to interruption without appreciable loss of content, comprising:

a receiver for receiving transitory audio information from an audio source;

a memory subsystem for storing data;

an audio output device;

a processor coupled to the receiver, the memory subsystem and the audio output device; and processor executable code stored within the memory subsystem for causing the processor to perform the steps of:

providing the transitory audio information to the audio output device until an interrupt signal is received;

when the interrupt signal is received, providing a message that is associated with the interrupt signal to the audio output device;

buffering the transitory audio information within the memory subsystem while said message is provided; and providing the buffered transitory audio information to the audio output device upon conclusion of the message, wherein the buffered transitory audio information is provided at a faster rate than new transitory information is being received.

10. The system of claim 9, wherein the interrupt signal is initiated by the actuation of a repeat function and the message corresponds to a predetermined portion of the buffered transitory audio information.

11. The system of claim 9, wherein the message is a route instruction.

12. The system of claim 9, wherein the message is a collision warning.

13. The system of claim 9, wherein the buffered transitory audio information is stored in a compressed format.

14. The system of claim 9, wherein the processor executable code causes the processor to perform the additional step of:

clearing the buffered transitory audio information from the memory subsystem when a different audio source is selected.

15. The system of claim 9, wherein the audio source is a radio station and the transitory audio information is provided in the form of a radio broadcast.

16. The system of claim 9, wherein the transitory audio information is buffered in response to the interrupt signal.

17. An audio information system for providing transitory audio information that is subject to interruption without appreciable loss of content, comprising:

a radio receiver for receiving transitory audio information in the form of a radio broadcast from a radio station;

a memory subsystem for storing data;

an audio output device;

a processor coupled to the receiver, the memory subsystem and the audio output device; and processor executable code stored within the memory subsystem for causing the processor to perform the steps of:

providing the transitory audio information to the audio output device until an interrupt signal is received;

providing a message that is associated with the interrupt signal to the audio output device;

buffering the transitory audio information within the memory subsystem while said message is provided; and providing the buffered transitory audio information to the audio output device upon conclusion of the message, wherein the buffered transitory audio information is provided at a faster rate than new transitory information is being received.

18. The system of claim 17, wherein the interrupt signal is initiated by the actuation of a repeat function and the message corresponds to a predetermined portion of the buffered transitory audio information.

19. The system of claim 17, wherein the message is a route instruction.

20. The system of claim 17, wherein the message is a collision warning.

21. The system of claim 17, wherein the buffered transitory audio information is stored in a compressed format.

22. The system of claim 17, wherein the processor executable code causes the processor to perform the additional step of:

clearing the buffered transitory audio information from the memory subsystem when a different audio source is selected.

23. The system of claim 17, wherein the transitory audio information is buffered in response to the interrupt signal.

* * * * *